(12) United States Patent
Farhang-Boroujeny et al.

(10) Patent No.: US 8,045,604 B2
(45) Date of Patent: Oct. 25, 2011

(54) ESTIMATION OF LOG-LIKELIHOOD USING CONSTRAINED MARKOV-CHAIN MONTE CARLO SIMULATION

(75) Inventors: Behrouz Farhang-Boroujeny, Salt Lake City, UT (US); Salam Akoum, Salt Lake City, UT (US)

(73) Assignee: University of Utah Research Foundation, Salt Lake City, UT (US)

(*) Notice: Subject to any disclaimer, the term of this patent is extended or adjusted under 35 U.S.C. 154(b) by 629 days.

(21) Appl. No.: 12/172,771

(22) Filed: Jul. 14, 2008

(65) Prior Publication Data
US 2008/0273632 A1    Nov. 6, 2008

Related U.S. Application Data

(63) Continuation-in-part of application No. 11/593,899, filed on Nov. 6, 2006, now Pat. No. 7,848,440, application No. 12/172,771, which is a continuation-in-part of application No. 11/177,938, filed on Jul. 7, 2005, now Pat. No. 7,457,367.

(60) Provisional application No. 60/734,665, filed on Nov. 7, 2005, provisional application No. 60/586,360, filed on Jul. 7, 2004.

(51) Int. Cl.
*H04B 3/46* (2006.01)
*H04B 17/00* (2006.01)
*H04Q 1/20* (2006.01)

(52) U.S. Cl. ........................ 375/224; 375/340

(58) Field of Classification Search .................. 375/224, 375/262, 316, 340–341
See application file for complete search history.

(56) References Cited

U.S. PATENT DOCUMENTS

| 6,064,703 | A * | 5/2000 | Cusani et al. ................. 375/349 |
| 6,725,025 | B1 | 4/2004 | Schmidl et al. |
| 7,076,000 | B2 | 7/2006 | Rodriguez |
| 2002/0110206 | A1 | 8/2002 | Becker et al. |
| 2004/0010399 | A1 | 1/2004 | Kadane et al. |
| 2004/0014445 | A1 | 1/2004 | Godsill et al. |
| 2004/0022336 | A1 * | 2/2004 | Yu et al. ........................ 375/346 |
| 2004/0161059 | A1 | 8/2004 | Andrieu |
| 2004/0174939 | A1 | 9/2004 | Wang |
| 2005/0105682 | A1 | 5/2005 | Heumann et al. |
| 2006/0023636 | A1 | 2/2006 | Farhang-Boroujeny et al. |
| 2007/0076669 | A1 | 4/2007 | Boroujeny et al. |
| 2007/0116143 | A1 * | 5/2007 | Bjerke et al. .................. 375/262 |

(Continued)

FOREIGN PATENT DOCUMENTS
WO    WO 2008/063183    11/2008

OTHER PUBLICATIONS

PCT/US2006/048914: International Search Report and Written Opinion of the International Searching Authority, (Sep. 2008).

(Continued)

*Primary Examiner* — Jean B Corrielus
(74) *Attorney, Agent, or Firm* — Fulbright & Jaworski L.L.P.

(57) ABSTRACT

Log likelihood ratios for data bits transmitted in a multi-dimensional signal are estimated using multiple Markov chain Monte Carlo simulations (MCMC). The MCMC simulations can include constraining symbols based on a most-likely symbol to improve the likelihood of finding distances for non-most-likely symbols. The log likelihood ratios can be calculated based on distances of the most-likely symbol and the non-most-likely symbols.

15 Claims, 6 Drawing Sheets

U.S. PATENT DOCUMENTS

2008/0019468 A1* 1/2008 Ammer et al. ............... 375/350
2008/0225974 A1* 9/2008 Prasad et al. ................. 375/262

OTHER PUBLICATIONS

Wang, Xiaodong et al., Monte Carlo Bayesian Signal Processing for Wireless Communications: Journal of VLSI Signal Processing, 2002 pp. 89-105, vol. 30, Netherlands.

Wang, Xiaodong et al, Interative (Turbo) Soft Interference Cancellation and Decoding for Coded CDMA IEEE Transactions on Communications, 1999 pp. 1046-1061, vol. 47, No. 7.

Huang, Yufei et al., "Multiuser Detection of Synchronous Code-Division Multiple-Access Signals by Perfect Sampling" IEEE Transactions on Communications, 2002, pp. 1724-1734, vol. 50, No. 7.

Chen, Rong et al. "Convergence Analyses and Comparisons of Markov Chain Monte Carlo Algorithms in Digital Communications" IEEE Transactions on Signal Processing, 2002, pp. 255-270, Vo. 50, No. 2.

Wang, Xiaodong et al, "Adaptive Bayesian Multiuser Detection for Synchronous CDMA with Gaussian and Impulsive Noise" IEEE Transactions on Signal Processing, 2000, pp. 2013-2028, vol. 47, No. 7.

Wang, Xiaodong et al., "Blind Turbo Equalization in Gaussian and Impulsive Noise" IEEE Transactions on Vehicular Technology, 2001, pp. 1092-1105, vol. 50, No. 4.

Yang et al., "Turbo Equalization for GMSK Signaling Over Multipath Channels based on the Gibbs Sampler", IEEE, Sep. 2001.

Wu et al., "Bayesian Multiuser Detection for CDMA System with Unknown Interference", IEEE, May 2003.

Djuric et al., "Perfect Sampling: A Review and Applications to Signal Processing", Feb. 2002.

M. Dangl, M. Reed, J. Lindner and Z. Shi, Advanced Markov Chain Monte Carlo Methods for Iterative (Turbo) Multiuser Detection, 4th International Symposium on Turbo Codes & Related Topics in connection with 6th International ITG-Conference on Source and Channel Coding (ISTC), Apr. 2006.

* cited by examiner

ESTIMATION OF LOG-LIKELIHOOD USING CONSTRAINED MARKOV-CHAIN MONTE CARLO SIMULATION

The present application is a continuation in part of co-pending U.S. patent application Ser. No. 11/593,899 filed Nov. 6, 2006 and entitled "Multi-Channel Communication Method and Apparatus using Plural Markov Chain Monte Carlo Simulations" which claims the benefit of U.S. Provisional Patent Application Ser. No. 60/734,665 filed Nov. 7, 2005 of the same title.

The present application is also a continuation in part of co-pending U.S. patent application Ser. No. 11/177,938 filed Jul. 7, 2005, entitled "Detector and Method for Estimating Data Probability in a Multi-Channel Receiver" which claims the benefit of U.S. Provisional Patent Application Ser. No. 60/586,360 filed Jul. 7, 2004 entitled "Detector and Method for Estimating User Data Probability in a Multi-Channel Receiver"

The disclosure of each of the above applications is incorporated by reference herein for all purposes.

FIELD

The present invention relates generally to wireless communication. More particularly, the present invention relates to techniques for detection of multiple-input multiple-output (MIMO) and multi-user code division multiple access (CDMA) signals.

BACKGROUND

Wireless communications have become ubiquitous. Improving the performance and capacity of wireless communications systems is highly desirable.

Code division multiple access (CDMA) and multiple-input multiple-output (MIMO) communications techniques share a number of common aspects. In a CDMA system, a number of users transmit simultaneously, with each user being identified by a different spreading code. The spreading codes can be mutually orthogonal, although this is often not the case. For example, in an "overloaded" system, more users are supported than orthogonal codes are available, and thus some cross-correlation exists between users. In a MIMO system, on the other hand, a number of different sub-streams (e.g. a data stream that has been demultiplexed into parallel sub-streams) are transmitted through separate antennas. At the receiver, different sub-streams are differentiated through their signatures (e.g., differing channel gains between each transmit antenna and a set of received antennas). Generally, the different substreams are received with a high degree of cross-correlation at individual receive antennas. In either a CDMA system or a MIMO system, the different users/sub-streams are transmitted in the same frequency band. Hence, in general, system capacity can increase with increasing number of users/sub-streams. In practice, however, interference between users/sub-streams can occur, and as the number of users/sub-streams increases, the complexity of a receiver tends to grow exponentially. While theoretically-optimal solutions are known in some situations, practical implementation considerations have motivated a search for sub-optimal, yet efficient, detectors.

SUMMARY

It has been recognized that it would be advantageous to develop computationally efficient techniques for calculating log likelihood ratios in a receiver.

In some embodiments of the invention, a method for estimating log likelihood ratios in a receiver includes receiving a multi-dimensional signal comprising a plurality of transmitted data bits. A first symbol estimate is formed, and the first symbol estimate has a first distance from an observation of the multi-dimensional signal. This first symbol estimate can be a minimum distance solution or an estimate of a minimum distance solution. The method can include initializing a plurality of Markov chain Monte Carlo simulations using a plurality of differing second symbol estimates. Each one of the second symbol estimates is constrained so that a differing one of its data bits is inverted relative to the corresponding data bit of the first symbol element. The Markov chain Monte Carlo simulations are run to stochastically search for constrained minimum second distances. Log likelihood ratios corresponding to each of the transmitted data bits can be calculated using the first distance and the constrained minimum second distances.

In some embodiments of the invention, a receiver system can include a signal storage having an input configured to accept digital samples of a multi-dimensional signal. The multi-dimensional signal can include a plurality of transmitted data bits. The system can also include a symbol estimator coupled to the signal storage and configured to estimate a first symbol estimate from the digital samples. A plurality of Markov chain Monte Carlo simulators can stochastically search for corresponding ones of a plurality of second symbol estimates, wherein each one of the second symbol estimates is constrained so that a differing bit is inverted relative to a corresponding bit of the first symbol estimate. A log likelihood calculator can output log likelihood ratio estimates corresponding to each of the plurality of transmitted data bits.

BRIEF DESCRIPTION OF THE DRAWINGS

Additional features and advantages of the invention will be apparent from the detailed description which follows, taken in conjunction with the accompanying drawings, which together illustrate, by way of example, features of the invention.

DETAILED DESCRIPTION

Figure 1:
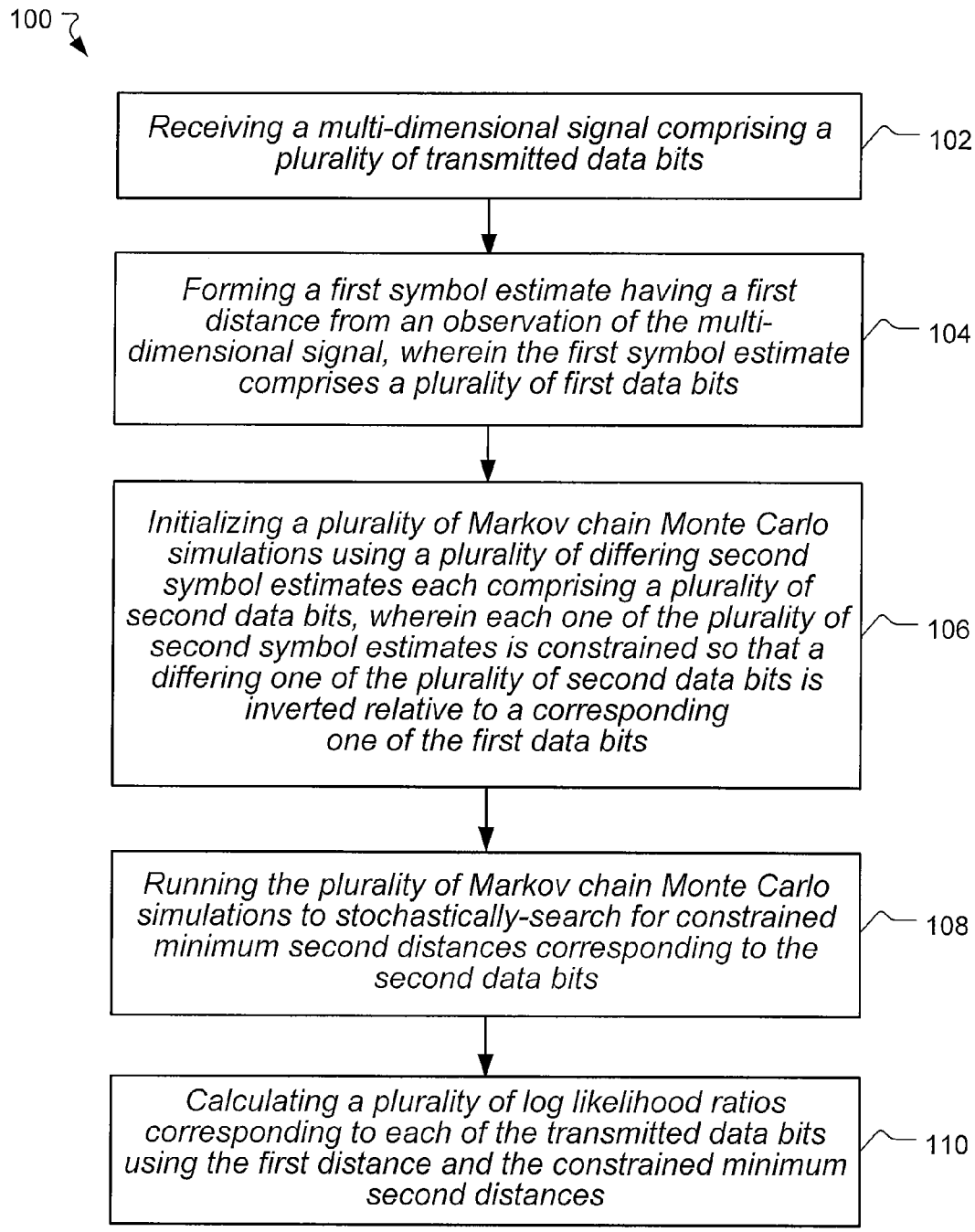
FIG. 1 is a flow chart of a process for estimating log likelihood ratios in a receiver in accordance with some embodiments of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing the present invention, the following terminology will be used:

The singular forms "a," "an," and "the" include plural referents unless the context clearly dictates otherwise. Thus, for example, reference to a symbol includes reference to one or more symbols.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

The following notations are adhered to throughout this application. Vectors are in column form and denoted by lowercase bold letters. Matrices are denoted by uppercase bold letters. Scalar quantities are denoted by lowercase non-bold letter, while scalar constants are denoted by uppercase non-bold letters. Thus, for example, the ij-th element of a matrix, e.g., A is denoted by $a_{ij}$. The superscripts $^T$ and $^H$ are used to denote matrix or vector transpose and Hermitian, respectively. The norm of a complex-valued vector x is defined as $\|x\|=x^H x$. Integer subscripts are used to distinguish different channels. Integer time indices are put in brackets. For example, $d_k(i)$ is used to denote the ith symbol of the channel k. In most expressions, the time index, i, is omitted for brevity. The notations $P(\cdot)$ and $p(\cdot)$ denote the probability of a discrete random variable and the probability density of a continuous random variable, respectively.

In multi-channel communications systems, powerful channel codes can be used, including for example convolutional codes, turbo codes, and low-density parity check codes. The input to a decoder can be provided as log-likelihood ratio (LLR) values of the coded bits. Exact computation of LLR values tends to grow exponentially in complexity with the number of simultaneously transmitted bits. For example, in a MIMO system with 4 transmit antennas using 64-state quadrature amplitude modulation (64-QAM) symbols transmitted from each antenna, each symbol carries 6 bits and thus a total of 24 bits are transmitted simultaneously. Thus, there are $2^{24}$ combinations of transmitted bits or 16,777,216 possible combinations of data. In other words, the signal can be represented in a multi-dimensional signal space. Calculating exact LLR values can involve examining all of these possible combinations (exploring the entire multi-dimensional signal space), resulting in prohibitive complexity.

One approach to a reduced complexity sub-optimal detector is to select a subset of all the possible combinations of data which are used for computation of the log likelihood ratios. For example, a deterministic search through the possible combinations can be performed using sphere decoding and other tree search methods. Unfortunately, although the subset may be significantly smaller than the entire signal space, the complexity of this type of searching tends to grow exponentially with the number of bits.

An alternate approach, as discussed in the above-referenced applications, is using Markov chain Monte Carlo (MCMC) methods to generate the subset of data. MCMC is a stochastic search, and provides benefits in that the growth of the search list and hence the complexity tends to grow only slightly faster than linear. Thus, a significant computational benefit can be achieved for high dimension signals.

As discussed in the above-referenced applications, however, at high signal to noise ratio, the performance of MCMC methods can degrade. This is because the underlying distribution being simulated by the MCMC method tends to have a number of regions of high probability separated by regions of low probability at high signal to noise ratio. The transition probabilities in the underlying Markov chain thus tend to cause the simulation to become trapped in certain states. Thus, the MCMC simulation can fail to explore portions of the signal space which have high likelihood of being the correct signal. A number of measures to address this are described in the above-referenced applications.

It has been recognized by the present inventor that certain properties of the log-likelihood ratio calculation can be used to further simplify the operation of a multi-channel receiver and reduce degradation at high signal to noise ratio. When calculating log-likelihood ratios, a max-log approximation can be used, for which the log-likelihood is approximated as the differences between a minimum unconstrained distance (common to all bits is each channel use) and a minimum constrained distance (one for each bit). The minimum constrained distances can be found (or approximately found) efficiently by a using a number of MCMC simulations initialized with differing data vectors. For example, FIG. 1 provides a flow chart of a process for estimating log-likelihood ratios.

Figure 2:
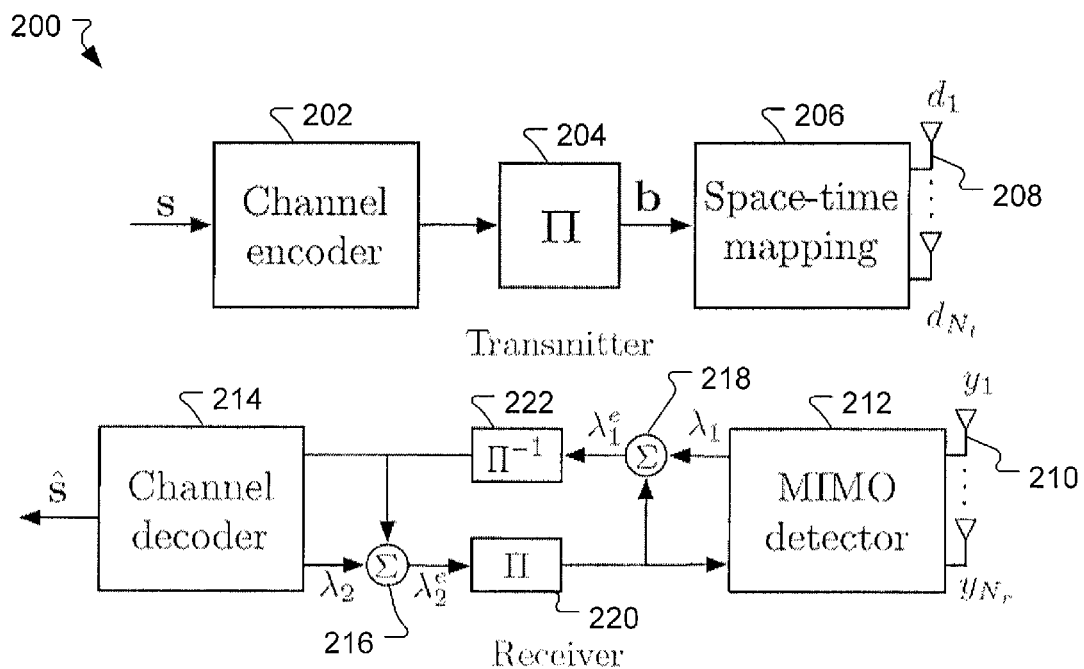
FIG. 2 is a block diagram of a multiple-input multiple-output transceiver system in accordance with some embodiments of the present invention.

Explanation of the operation of the process will be made with reference to a mathematical model of one example of a communication system in which some embodiments of the present invention can be practiced. A block diagram of an $N_t$-by-$N_r$ MIMO transceiver system is shown in FIG. 2. While a MIMO transceiver system 200 is shown, the invention is not so limited, and operation in CDMA and similar types of systems will be apparent from the following discussion.

At the transmitter, the information word s is encoded by the channel encoder 202. The output of the channel encoder after passing through an interleaver 204 is divided into the blocks of M bits. These blocks form a vector sequence $b(n)=[b_1(n) \; b_2(n) \ldots b_M(n)]^T$, where n is the time index. Each b(n) is then mapped to the transmit symbol $d(n)=[d_1(n) \; d_2(n) \ldots d_{N_t}(n)]^T$ by a space-time mapping 206 or other mapping methods and transmitted via the antennas 208. For example, each element of d(n) can carry $M_c=M/N_t$ coded bits and thus is chosen from a $2^{M_c}$-ary QAM/PSK constellation. Each value of n can thus corresponds to one channel use and, hence, during each channel use M coded bits are being transmitted. For brevity, since most of the following discussion corresponds to one channel use, i.e., a fixed n, the time index n is dropped.

For a flat fading channel, the received signal at the antennas 210 can be modeled as $$y=Hd+n, \quad (1)$$

where $Y=[y_1 \; y_2 \ldots y_{N_r}]^T$, H is the channel gain matrix and n is the channel noise. While the invention is not so limited, n can be is a Gaussian vector with zero mean and the covariance matrix $E[nn^H]=\sigma_n^2 I$.

The receiver can include a MIMO detector 212 that generates LLR values (soft information) of $b_1$ through $b_M$, and passes them to the channel decoder 214 for further processing. The channel decoder can further improve the soft information of the coded bits, i.e., b, and feed the result back to the MIMO detector. After a few iterations between MIMO detector and channel decoder, the final decision about the transmitted uncoded bits is made by the channel decoder. For later reference, $\lambda_1$ and $\lambda_2$ denote the LLR values generated by the MIMO detector and channel decoder, respectively, and $\lambda_1^e$ and $\lambda_2^e$ are the respective extrinsic LLR values, i.e, after subtracting the incoming LLR values using substractors 216,

218 as in FIG. 2. The receiver can include interleaver 220 and deinterleaver 222 corresponding to the interleaver 204 of the transmitter.

The LLR value of an information bit b can be defined as:

$$\lambda(b) = \ln \frac{P(b = +1)}{P(b = -1)} \quad (2)$$

where P(b=+1) means the probability of b=+1 (equivalent of logical 1), and P(b=-1) means the probability of b=-1 (equivalent of logical 0). Although not shown here, the probabilities are typically conditioned on the received signal value and other parameters (e.g., extrinsic information from other parts in the receiver) and, as a result, exact calculation of the LLR values is lengthy and complex. The above-referenced applications describe some techniques that can be used to approximate the LLR values.

According the some embodiments of the present invention, to reduce the complexity of computation of LLR values, an approximation known as max-log can be used. In the case of a MIMO detector, when there is no extrinsic information from channel decoder, the max-log approximation is given by:

$$\lambda_1(b_k) = \frac{1}{\sigma_n^2} \left( \min_{d_k^-} \|y - Hd_k^-\|^2 - \min_{d_k^+} \|y - Hd_k^+\|^2 \right). \quad (3)$$

The definition of $d_{k^+}$ and $d_{k^-}$ will now be explained. Recall that the symbol vector d is obtained from the bit vector b through a mapping process. Also, in equation (3), $b_k$ refers to the $k^{th}$ element of b. The vectors $d_{k^+}$ and $d_{k^-}$ denote the choices of d that are obtained from b when $b_k$=+1 and $b_k$=-1, respectively. Hence, min $d_{k^+}$$\|y-Hd_{k^+}\|^2$ implies minimization of the norm of the error vector e=y-Hd when $b_k$ is fixed at +1 and other elements of b are varied. Similarly, min $d_{k^-}$$\|y-Hd_{k^-}\|^2$ implies minimization of the norm of e=y-Hd when $b_k$ is fixed at -1 and other elements of b are varied. A brute force minimization of each term involves a search over all possible choices of the elements of b except $b_k$ (which is fixed at +1 or -1) and thus has a complexity that grows exponentially with the size of b.

Accordingly, using MCMC to search a small subset of values of b, yet find a good sample set such that good estimates of the two minimum norms on the right hand side of equation (3) can significantly reduce complexity of estimating the LLR values.

As described in the above-referenced applications, an MCMC uses a Markov chain in which the states are specified by various choices of the vector b (or, equivalently, d). The transition between the states can be constrained and, depending on the imposed constraints, different choices of the Markov chain are obtained. A particular choice that lends itself to a very simple method of collecting samples for LLR computation, called Gibbs Sampling (GS), is when the transitions between the states are constrained to those that differ by only one bit. The GS is described in the above-referenced applications.

GS is effectively a random walk through the states of the underlying Markov chain. The detector will provide good probability estimates provided that GS visits the states that correspond to the desired minimum norms on the right-hand side of equation (3). According to the theory of MCMC, as long as the underlying Markov chain remains irreducible, i.e., all the states are connected together through one or more transitions, the GS, if run for a sufficiently large number of iterations, almost always visits all the states, thus finds the desired minimum norms. However, the number of required iterations of the GS for successful operation of the MIMO detector may be prohibitively large when some of the transition probabilities become very low as discussed further below.

As noted in the above-referenced applications, at high signal to noise ratios, the GS can sometimes fail to find the desired minimum norms on the right-hand side of equation (3). This can be mitigated by using parallel GSs that are initialized from independently chosen random initial starting states. Another approach is using higher noise variances than the true noise variance, and adjusting for this when calculating the LLR values.

Note that $$\min\left(\min_{d_k^+}\|y - Hd_{k^+}\|^2, \min_{d_k^-}\|y - Hd_{k^-}\|^2\right) = \min_d \|y - Hd\|^2, \quad (4)$$

i.e., the smaller of the two norms on the right-hand side of equation (3), is equal to the minimum value of $\|y-Hd\|^2$ over all possible choices of d (or, equivalently, b). Recall that the choice of d that minimizes $\|y-Hd\|^2$ is called the maximum likelihood (ML) estimate of d. Talking note of this, for convenience of reference to the two norms in equation (3), the smaller of the two norms is referred to as ML term and the larger one is referred to as non-ML (N-ML) term.

The GS searches for the states that correspond to the smaller values of $\|y-Hd\|^2$. As a result, there is a good chance that at least one of the parallel GSs finds the ML term correctly. While this may not be guaranteed, success can be enhanced if the GS is initialized to a state which corresponds to a small norm $\|e\|^2 = \|y-Hd\|^2$. One simple, yet effective, initialization that achieves this goal is to first calculate the non-quantized symbol vector $\bar{d}=(H^H H)^{-1}H^H y$ and then quantize the result. This is called the zero-forcing (ZF) solution. Other approaches can also be used, such as performing minimum mean-square error (MMSE), successive interference cancellation (SIC), parallel interference cancellation (PIC), or even computationally-intense list sphere decoding (LSD) or sphere decoding (SD) for initializing the GS to a state with a small norm.

It has been noted, however, that the GS is likely to miss a fair percentage of the N-ML terms due to stalling at high probability states. Randomly initialized GSs can serve the purpose of trying other parts of the Markov chain which possibly results in a good estimates of at least a fair percentage of the N-ML terms, The states in a Markov chain are connected together via links (often called edges) whose strength is given by the probability of transition between various states. Hence, stalling can happen if all the incoming edges to a state are strong, and all the outgoing edges from the same state are weak. This can happen in MCMC detectors in high SNR regime. To elaborate, let $S_0$ and $S_1$ be a pair of adjacent/connected states in the underlying Markov chain of an MCMC MIMO detector. Also, let $d_0$ and $d_1$ be the associated symbol vectors, respectively. Assuming that there is no extrinsic information, following the Gibbs sampling procedure, the transition probabilities between the states $S_0$ and $S_1$ are obtained as $$P(S_1 \to S_0) = \frac{e^{-\|y-Hd_0\|^2/\sigma_n^2}}{e^{-\|y-Hd_0\|^2/\sigma_n^2} + e^{-\|y-Hd_1\|^2/\sigma_n^2}} \text{ and} \quad (5)$$

$$P(S_0 \to S_1) = \frac{e^{-\|y-Hd_1\|^2/\sigma_n^2}}{e^{-\|y-Hd_0\|^2/\sigma_n^2} + e^{-\|y-Hd_1\|^2/\sigma_n^2}} \quad (6)$$

When $\|y-Hd_0\|^2 < \|y-Hd_1\|^2$, $P(S_1 \to S_0) > P(S_0 \to S_1)$, meaning that the GS with a higher chance selects $S_0$ over $S_1$. Moreover, the difference between $P(S_1 \to S_0)$ and $P(S_0 \to S_1)$ increases as $\sigma_n^2$ decreases, i.e., as one moves into high SNR regime. This shows that as SNR increases, while incoming edges to a state become stronger, the outgoing edges may become excessively weak, increasing the chance of stalling.

Clearly, improving the estimates of the N-ML terms can be of significant benefit in improving the overall likelihood estimates. Based on the ML term found above, N-ML terms can be searched for as follows. Starting with the ML solution obtained from the ZF-initialized GS or through any other method, an additional set of M GSs are run, each with one of the bits of b constrained to remain fixed at the value opposite to its value in the ML solution and the rest of the bits are allowed to vary according to the Gibbs sampling procedure. This, with a judicious initialization of d, can result in improved estimates of the desired N-ML terms.

For example, one reasonable choice for initialization of d is to make sure that simulation begins with a constrained b that is chosen to correspond to a relatively small value of $\|y-H_d\|^2$; what constrained b means will become clear below.

Let $\hat{d}_{ML}$ denote the ML estimate of d obtained through the ZF-initialized GS (or through any other effective method). Also, let $\hat{b}_{ML}$ be the bit vector associated with $\hat{d}_{ML}$. Note that by the norm $D_{ML} = \|y-H\hat{d}_{ML}\|^2$ is generally small; a value equal to or close to $D_{ML}$. Moreover, a small disturbance in $\hat{d}_{ML}$ will result in a small variation in the norm $\|y-Hd\|^2$. Noting this, while searching for the N-ML terms, the set of parallel GSs can be initialized with choices of d that are close to $\hat{d}_{ML}$ and satisfy the required constraints on the elements of b. When the mapping from b to d is through partitioning of b into $2N_t$ blocks which in turn are mapped to the real and imaginary parts of the elements of d, the process of finding the closet values of d to $\hat{d}_{ML}$ is a straightforward task. To initialize d for finding the N-ML term that corresponds to, say, $b_k$, first the block that $b_k$ belongs to is identified. Then the same block in $\hat{b}_{ML}$ is identified and converted to a new block in which $b_k$ is inverted and the rest of the bits are adjusted such that the element of d that is affected by this change experiences minimal variation. Other elements of d are intact. This can be described as bit flipping with minimum disturbance. Note that flipping $b_k$ is the constraint, and keeping the minimum disturbance assures starting with a good initial value of b (and, thus, d) and results in a fair N-ML term/distance. Running the associated constrained GS subsequently improves the N-ML term further.

As a specific example, consider the case where data symbols are taken from a 64-QAM alphabet and mapping from bits to symbols follows gray coding. Table 1 illustrates Gray mapped patterns of three bits to 8 PAM (pulse amplitude modulated) levels and note that a pair of PAM symbols are used as real and imaginary parts of a QAM symbol (note, 8×8=64). As an example, let the block of $\hat{b}_{ML}$ that $b_k$ belongs to be $b_1 b_2 b_3 = 010$. According to Table 1, this corresponds to the PAM level d=−1. Also, from Table 1, observe that if the bit of interest is $b_1$, the nearest PAM level with $b_1=1$ (flipped version of $b_1=0$) is d=+1, with the corresponding bits $b_1 b_2 b_3 = 110$. Similarly, if the bit of interest is $b_3$, the nearest PAM level with $b_3=1$ (flipped version of $b_3=0$) is d=−3 with the corresponding bits $b_1 b_2 b_3 = 011$. Note that in both cases the target bit has simply been inverted. This is not generally true. For instance, in the present example, if the bit of interest is $b_2$, the nearest PAM level with $b_2=0$ (flipped version of $b_2=1$) is d=−5 with the corresponding bits $b_1 b_2 b_3 = 001$, in which $b_3$ is also flipped. Following the same logic, it is straightforward to find the nearest neighbors of other bit combinations as well. Such neighbors can be tabulated and a table look-up method can be used for an efficient implementation.

TABLE 1

Gray coded 3-bit binary numbers and their equivalent PAM levels.

| $b_1$ | $b_2$ | $b_3$ | PAM level, d |
|---|---|---|---|
| 0 | 0 | 0 | −7 |
| 0 | 0 | 1 | −5 |
| 0 | 1 | 1 | −3 |
| 0 | 1 | 0 | −1 |
| 1 | 1 | 0 | +1 |
| 1 | 1 | 1 | +3 |
| 1 | 0 | 1 | +5 |
| 1 | 0 | 0 | +7 |

Figure 3:
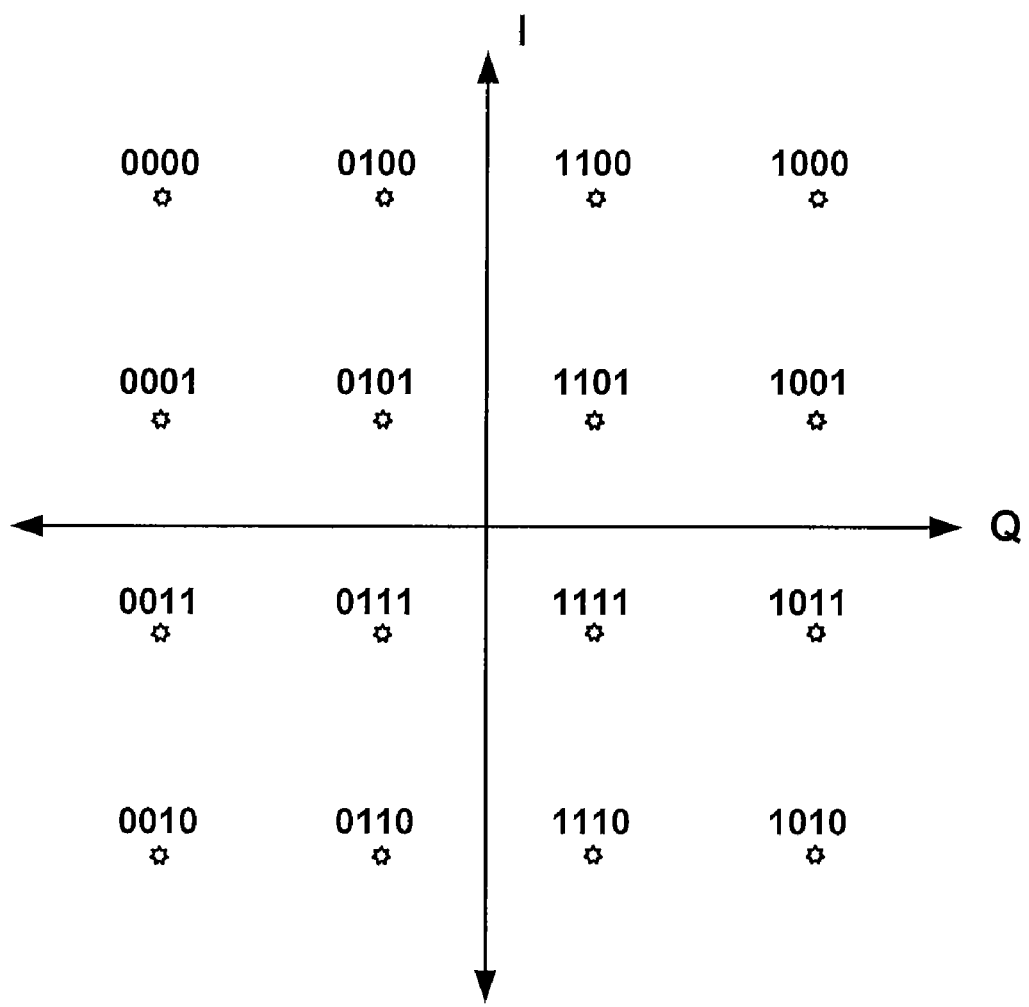
FIG. 3 is an I-Q signal space diagram of a 16-QAM constellation in accordance with some embodiments of the present invention.

Another illustration of bit flipping with minimized disturbance can be explained in conjunction with FIG. 3 which illustrates a 16-QAM constellation. Shown are the 16 constellation points, each labeled with the corresponding bit values $b_1 b_2 b_3 b_4$. Taking a symbol value of 0000, for example, if $b_1$ is flipped (inverted) to set it equal to 1, the closest constellation point (and thus minimum distance difference) is the symbol value of 1100. Thus, $b_2$ is also flipped (inverted). Taking a symbol value of 1111, the closest symbols with each bit flipped (inverted) are correspondingly 0111 ($b_1$ flipped), 1011 ($b_2$ flipped), 1101 ($b_3$ flipped), and 1110 ($b_4$ flipped). In general, for the 16-QAM constellation, the bit flipping with minimized disturbance will select a new data vector that is one row, one column, two rows, or two columns away from the original data vector.

Thus, to summarize, a process 100 (FIG. 1) of estimating the log likelihood ratio can include receiving 102 a multi-dimensional signal. For example, the multi-dimensional signal can be a CDMA or MIMO signal. The signal can include a plurality of transmitted data bits. For example, the data bits can be arranged in blocks. The signal may be provided as a wireless radio signal (which is amplified, downconverted, filtered, digitized, and has other operations performed thereon) or as digitized signal samples.

The process can include forming 104 a first symbol estimate. The first symbol estimate has a distance from an observation of the multi-dimensional signal. For example, the distance may be a minimum distance found by searching using ZF, MMSE, MCMC, SIC, PIC, SD, or similar techniques. The first symbol estimate includes a plurality of first data bits.

Another operation of the process can be initializing 106 a plurality of MCMC simulations using a plurality of differing second symbol estimates. For example, each of the MCMC simulations can be a GS. The second symbol estimates can each include a plurality of second data bits. In each of the second symbol estimates, one bit can be constrained to be inverted relative to a corresponding one of the first data bits. A different bit can be constrained in each second symbol. The second symbol estimates can also be initialized to minimize disturbance, as described above.

The process 100 can also include running the plurality of MCMC simulations to stochastically-search for constrained minimum second distances. A constrained minimum second distance is found corresponding to each of the inverted second data bits. These minimum second distances correspond to estimates of the non-ML terms as described above. Log likelihood ratios corresponding to each of the transmitted data bits can be calculated 110 using the first distance and the constrained minimum second distances. For example, a difference between the first distance and each of the constrained minimum second distances can be obtained and scaled to form the log likelihood ratios. For example, the first distance can be subtracted from each of the constrained minimum second distances to form the log likelihood ratios.

Figure 4:
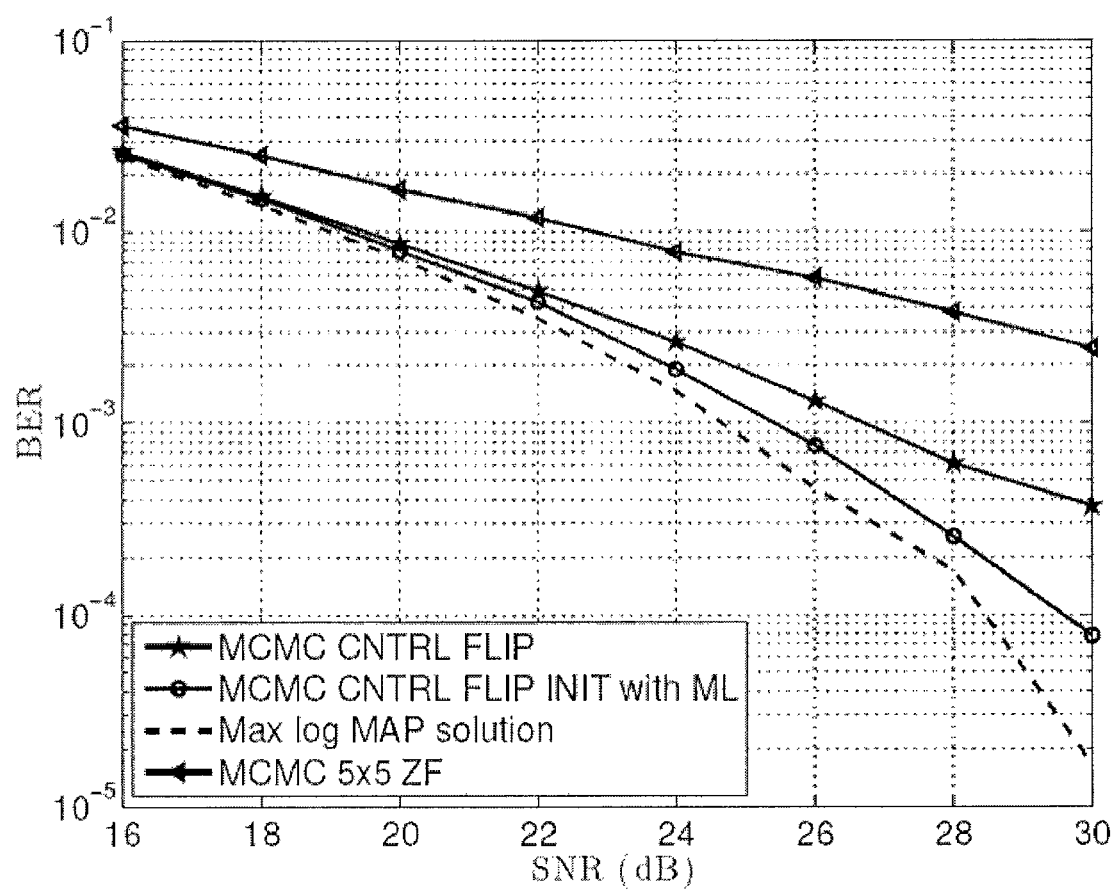
FIG. 4 is a graph comparing performance of some embodiments of the present invention with empirically obtained bounds.

Performance of the process has been simulated, and results in the form of bit error rate curves are shown in FIG. 4 along with various theoretically obtained results. Simulations were performed using a block fading channel, in which the channel H is fixed for each packet transmission, but changes to a different channel for the next packet. H was generated by setting the elements to independent identically distributed complex random variables, each with a variance of unity and independent real and imaginary parts. The successive choices of H were independent of each other. Each packet was 100 bits which are coded to 200 coded bits through a rate ½ convolutional code using generator polynomials 1 and $1+D^2+D^7$. The system used two transmit and two receive antennas, and data symbols were selected from a 64-QAM constellation.

The lower bound shown in a dotted line was obtained from a max-log maximum a posteriori probability obtained by performing an exhaustive search. By comparison, the upper most performance curve (solid line plus triangles) is obtained using 5 MCMC simulations, where four are initialized randomly and one is initialized using a zero forcing solution.

The curve labeled "MCMC CNTRL FLIP" (solid line plus stars) illustrates the performance of a process of decoding using bit flipping with minimized disturbance as described above. It can be seen this results in improved performance. For comparison, another curve labeled "MCMC CNTRL FLIP INIT with ML" (solid line plus open circles) shows where the ML terms are found exactly (using an exhaustive search) and then the DML obtained is used to initialize the bit flipped MCMC simulations.

Various ways of implementing the present techniques in a receiver can be used. For example, the necessary calculations can be implemented using adders, subtractors, lookup tables, and comparators, and thus may be implemented efficiently in digital hardware. For example, the techniques can be implemented in a field programmable gate array (FPGA) or application specific integrated circuit (ASIC).

Figure 5:
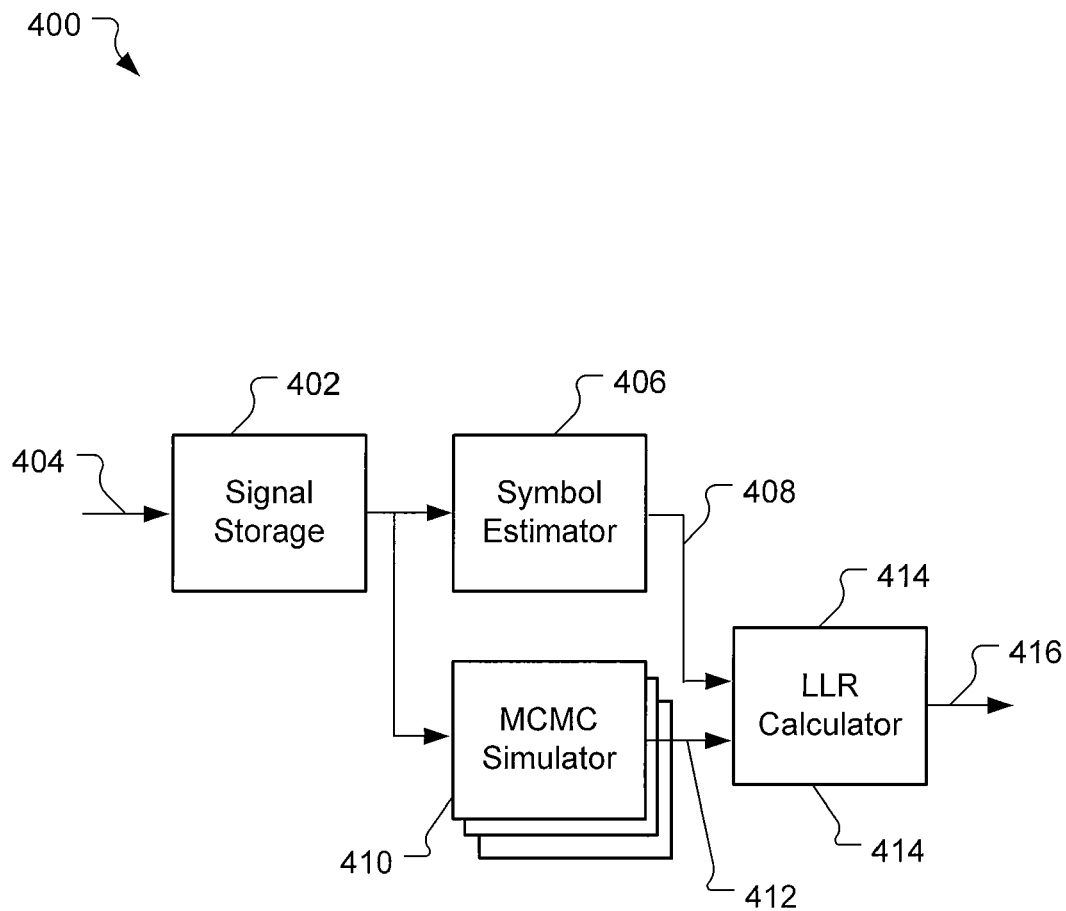
FIG. 5 is a block diagram of a receiver in accordance with some embodiments of the present invention.

For example, FIG. 5 illustrates one example of a high level block diagram of a multi-channel receiver 400 in accordance with some embodiments of the present invention. The receiver can include a signal storage 402 that accepts digital samples 404 of a multi-dimensional signal. A symbol estimator 406 (e.g., a ZF, SIC, PIC, LSD, MCMC simulation, etc) is coupled to the signal storage and estimates a first symbol estimate 408 from the digital samples.

A plurality of MCMC simulators 410 are coupled to the signal storage and stochastically search for corresponding ones of a plurality of second symbol estimates. The MCMC simulators are initialized with constrained second symbol estimates, for example, as described above. The MCMC simulators output second symbol estimates 412.

A log likelihood 414 calculator is coupled to the symbol estimator 406 and the plurality of MCMC simulators 410 and outputs log likelihood ratio estimates 416 corresponding to each of the plurality of transmitted data bits. The log likelihood ratio estimates can be obtained by subtracting distance of the first symbol estimate from distances of the second symbol estimates, for example as described above.

Figure 6:
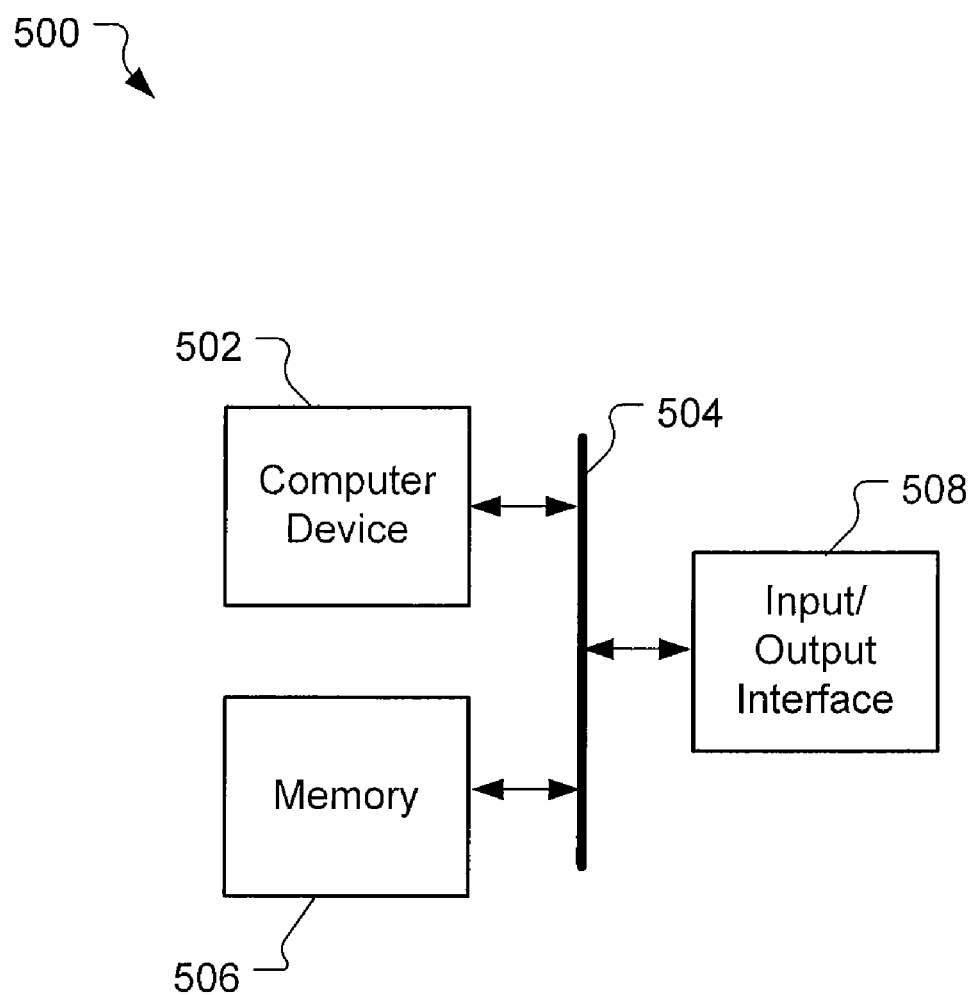
FIG. 6 is a block diagram of processor operating environment in which some embodiments of the present invention can be implemented.

As another example, some or all of the above techniques may be implemented in software or firmware. For example, FIG. 6 illustrates a processor operating environment 500 in which software implementation of the present techniques can be provided. The processor operating environment can include a computer device 502, which can be a general-purpose or special-purpose processor (e.g., a digital signal processor) or multiple processors. The computer device can include a bus 504 which can be configured to connect various components thereof and can also enable data to be exchanged between two or more components. The bus can include a variety of bus structures such as, for example, a memory bus or memory controller, a peripheral bus, or a local bus that uses any of a variety of bus architectures. For example, the bus can interface the computer device to a memory 506, including for example an instruction memory, data memory, mass storage memory, or the like. The bus can also interface to processor to an input/output interface 508 and other components.

The processor can execute instructions provided on computer readable media, such as on a memory 506, a removable memory, a magnetic hard disk, a removable magnetic disk, a magnetic cassette, an optical disk, or from a communication connection, which may also be viewed as a computer readable medium.

The memory 506 can include one or more computer readable media that can be configured to include or includes thereon data or instructions for manipulating data, and can be accessed by the computer device 502 through the bus 504. The memory can include, for example, ROM, used to permanently store information, and/or RAM, used to temporarily store information. ROM may include a basic input/output system ("BIOS") having one or more routines that are used to establish communication, such as during start-up of the computer device 502. RAM may include one or more program modules, such as one or more operating systems, application programs, and/or program data.

The input/output interface 508 can provide for exchange of data between the computer device and other system components, including for example, analog to digital converters, other computer devices, hardware components, and the like.

Some embodiments of the invention can include a computer readable media having computer executable instructions stored thereon. The computer executable instructions can include data structures, objects, programs, routines, or other program modules that may be accessed by a processing system, such as one associated with a general-purpose computer capable of performing various different functions or one associated with a special-purpose computer capable of performing a limited number of functions. Computer executable instructions can cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), and other devices or components that are capable of providing data or executable instructions that may be accessed by a processing system. Memories can be implemented in various technologies, including without limitation static memory cells, dynamic memory cells, magnetic memory, optical memory, and similar technologies.

As yet another example, some embodiments of the present invention may include portions implemented in hardware and portions implemented in software. For example, some modules may be implemented in hardware and interface to other modules implemented in software. Individual modules may include a mixture of hardware and software.

Summarizing and reiterating to some extent, statistical search techniques for estimation of log likelihood ratios have been developed that can be applied to MIMO and CDMA communications systems. While MCMC simulations can run into difficulties at high signal to noise ratio, techniques for initializing the simulations using bit flipping with minimized disturbance can help to avoid these difficulties. The estimated log likelihood ratios can be used, for example, in forward error correction decoding. It has been shown that performance (e.g., simulated bit error rates) can be improved relative to alternate MCMC techniques.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

The invention claimed is:

1. A method of estimating log likelihood ratios in a receiver comprising:
    receiving using a receiver a multi-dimensional signal comprising a plurality of transmitted data bits;
    forming a first symbol estimate having a first distance from an observation of the multi-dimensional signal wherein the first symbol estimate comprises a plurality of first data bits;
    initializing a plurality of Markov chain Monte Carlo simulations using a plurality of differing second symbol estimates each comprising a plurality of second data bits, wherein each one of the plurality of second symbol estimates is constrained so that a differing one of the plurality of second data bits is inverted relative to a corresponding one of the first data bits;
    running the plurality of Markov chain Monte Carlo simulations to stochastically-search for constrained minimum second distances corresponding to the second data bits; and
    calculating a plurality of log likelihood ratios corresponding to each of the plurality of transmitted data bits using the first distance and the constrained minimum second distances.

2. The method of claim 1, wherein the multi-dimensional signal is code division multiple access signal comprising a plurality of user signals each user signal encoded with a different one of a plurality of codes.

3. The method of claim 2, wherein the plurality of codes are not mutually orthogonal.

4. The method of claim 1, wherein the multi-dimensional signal is a multiple-input multiple-output signal comprising a plurality of data streams each data stream transmitted on a different one of a plurality of antennas.

5. The method of claim 1, wherein the forming a first symbol estimate comprises searching for a symbol estimate having a minimum distance of all possible symbol estimates.

6. The method of claim 1, wherein the forming a first symbol estimate comprises determining a most likely symbol solution.

7. The method of claim 1, wherein the forming a first symbol estimate comprises any one of determining a zero forcing solution, determining a minimum mean square error symbol solution, determining a successive interference cancellation symbol solution, determining a parallel interference cancellation symbol solution, determining a sphere decoding symbol solution.

8. The method of claim 1, wherein the forming a first symbol estimate comprises performing a Markov chain Monte Carlo simulation.

9. The method of claim 1, wherein each one of the plurality of second symbol estimates is initialized so that the second data bits other than the differing one of the plurality of second data bits are set to values that minimize the distance from the first symbol estimate.

10. The method of claim 1, wherein the running the plurality of Markov chain Monte Carlo simulations comprises using Gibbs sampling.

11. The method of claim 1, wherein the calculating a plurality of log likelihood ratios comprises determining a difference between the first distance from each of the constrained minimum second distances.

12. A receiver comprising:
    a signal storage having an input configured to accept digital samples of a multi-dimensional signal comprising a plurality of transmitted data bits;
    a symbol estimator coupled to the signal storage and configured to estimate a first symbol estimate from the digital samples;
    a plurality of Markov chain Monte Carlo simulators coupled to the signal storage and configured to stochastically search for corresponding ones of a plurality of second symbol estimates, wherein each one of the second symbol estimates is constrained so that a differing bit is inverted relative to a corresponding bit of the first symbol estimate; and
    a log likelihood calculator coupled to the symbol estimator and the plurality of Markov chain Monte Carlo simulators and configured to output log likelihood ratio estimates corresponding to each of the plurality of transmitted data bits.

13. The receiver of claim 12, wherein the symbol estimator comprises any one of a zero forcing equalizer, a minimum mean square error equalizer, a successive interference canceller, a parallel interference canceller, and a sphere decoder.

14. The receiver of claim 12, wherein the symbol estimator comprises a Markov chain Monte Carlo simulator.

15. The receiver of claim 12, wherein the Markov chain Monte Carlo simulators are Gibbs samplers.

* * * * *